(12) United States Patent
Kim

(10) Patent No.: US 9,019,170 B2  
(45) Date of Patent: Apr. 28, 2015

(54) DISPLAY DEVICE AND METHOD FOR CONTROLLING THE SAME

(71) Applicant: LG Electronics Inc., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 86 days.

(21) Appl. No.: 13/888,677

(22) Filed: May 7, 2013

(65) Prior Publication Data

US 2014/0267091 A1    Sep. 18, 2014

(30) Foreign Application Priority Data

Mar. 14, 2013   (KR) .................. 10-2013-0027212  
Apr. 8, 2013    (KR) ................. PCT/KR2013/002904

(51) Int. Cl.
*G09G 5/00*   (2006.01)
*G06F 3/041*  (2006.01)
*G06F 1/16*   (2006.01)

(52) U.S. Cl.
CPC .............. *G06F 3/041* (2013.01); *G06F 1/1652* (2013.01)

(58) Field of Classification Search
CPC ... G06F 3/1423; G09G 3/3688; G09G 3/3648
USPC ..................... 345/204, 87, 1.1, 173
See application file for complete search history.

(56) References Cited

U.S. PATENT DOCUMENTS

| | | | |
|---|---|---|---|
| 2010/0029327 A1 | 2/2010 | Jee | |
| 2011/0086680 A1 | 4/2011 | Kim et al. | |
| 2011/0134145 A1* | 6/2011 | Moriwaki | 345/660 |
| 2011/0267541 A1* | 11/2011 | Hirokane | 348/671 |
| 2012/0092363 A1 | 4/2012 | Kim et al. | |
| 2012/0236893 A1 | 9/2012 | Phillips et al. | |
| 2012/0249622 A1* | 10/2012 | Yoshida et al. | 345/698 |
| 2012/0268445 A1* | 10/2012 | Ogata et al. | 345/212 |
| 2012/0274575 A1 | 11/2012 | Solomon et al. | |
| 2013/0300697 A1* | 11/2013 | Kim et al. | 345/173 |
| 2014/0118271 A1* | 5/2014 | Lee et al. | 345/173 |

FOREIGN PATENT DOCUMENTS

| | | |
|---|---|---|
| KR | 10-1004930 B | 12/2010 |
| KR | 10-2011-0035162 A | 4/2011 |

* cited by examiner

*Primary Examiner* — Kevin M Nguyen

(74) *Attorney, Agent, or Firm* — Birch, Stewart, Kolasch & Birch, LLP

(57) ABSTRACT

A display device and a method for controlling the same are disclosed, in which some area of a curved area is used as an additional display area of the other display area in accordance with a location of a user if a area where image data are displayed includes the curved area.

20 Claims, 14 Drawing Sheets

DISPLAY DEVICE AND METHOD FOR CONTROLLING THE SAME

This application claims the benefit of Korean Patent Application No. 10-2013-0027212 filed on Mar. 14, 2013 and International Patent Application No.: PCT/KR2013/002904 filed on Apr. 8, 2013, which are hereby incorporated by reference as if fully set forth herein.

BACKGROUND OF THE DISCLOSURE

1. Field of the Disclosure

The present specification relates to a display device and a method for controlling the same, and more particularly, to a display device and a method for controlling the same, in which a part of a curved area is used as an additional display area of a display area in accordance with a location of a user if a area where image data are displayed includes the curved area.

2. Discussion of the Related Art

With the development of the display related technology, various types of flexible displays have been discussed. Also, a commercialized flexible display has been launched.

However, according to the recent trend, instead of a display device fully based on a flexible display, a display device partially based on a flexible display has been mainly launched due to a technical transition period. In this respect, a display area of the display device may include a partially curved area.

If the display device includes a curved display area, a user located at the front may view only a part without viewing a full display area. Accordingly, if the display device includes a curved display area, a problem occurs in that the full display area cannot be used.

Also, if the display device includes a curved display area, the display area is varied depending on the location of the user. In other words, the display area that may be viewed by the user is varied depending on the location of the user. However, a problem occurs in that the display device may display image data regardless of the location of the user.

SUMMARY OF THE DISCLOSURE

Accordingly, the present specification is directed to a display device and a method for controlling the same, which substantially obviate one or more problems due to limitations and disadvantages of the related art.

An object of the present specification is to provide a display device and a method for controlling the same, which efficiently uses a display area if the display device includes a curved display area.

Another object of the present specification is to provide a display device and a method for controlling the same, which identifies a curved display area from the other display area if the display device includes the curved display area and uses a part of the identified display area as an additional display area of the other display area.

Other object of the present specification is to provide a display device and a method for controlling the same, which sets a display area, which is other than a curved display area and uses the curved display area as an additional display area, differently depending on a location of a user if the display device includes the curved display area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the specification, as embodied and broadly described herein, a display device comprises a sensor unit configured to sense a location of a user and transferring a signal based on the sensed result to a processor; a display unit configured to output image data, the display including a first display area of which normal line is directed towards a first direction, a second display area which is adjacent to the first display area and includes a curved area, and a third display area which is adjacent to the second display area and includes a curved area and of which normal line is directed towards a second direction; and a processor configured to control the sensor unit and the display unit, wherein the processor detects a direction of the user with respect to the display device in accordance with the location of the user, enters a first display mode if the direction of the user corresponds to the first direction, the first display mode using the second display area as an additional display area of the first display area, and enters a second display mode if the direction of the user corresponds to the second direction, the second display mode using the second display area as an additional display area of the third display area.

In another aspect, in method for controlling a display device, which comprises a display unit including a first display area of which normal line is directed towards a first direction, a second display area which is adjacent to the first display area and includes a curved area, and a third display area which is adjacent to the second display area and includes a curved area and of which normal line is directed towards a second direction, the method comprises the steps of detecting a direction of a user with respect to the display device in accordance with a location of the user, which is sensed through a sensor unit; entering a first display mode if the detected direction of the user corresponds to the first direction, the first display mode using the second display area as an additional display area of the first display area; and entering a second display mode if the detected direction of the user corresponds to the second direction, the second display mode using the second display area as an additional display area of the third display area.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE DISCLOSURE

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

The embodiments shown in the accompanying drawings and described by the drawings are only exemplary, and technical spirits of the present specification and its main operation are not limited by such embodiments.

Figure 1:
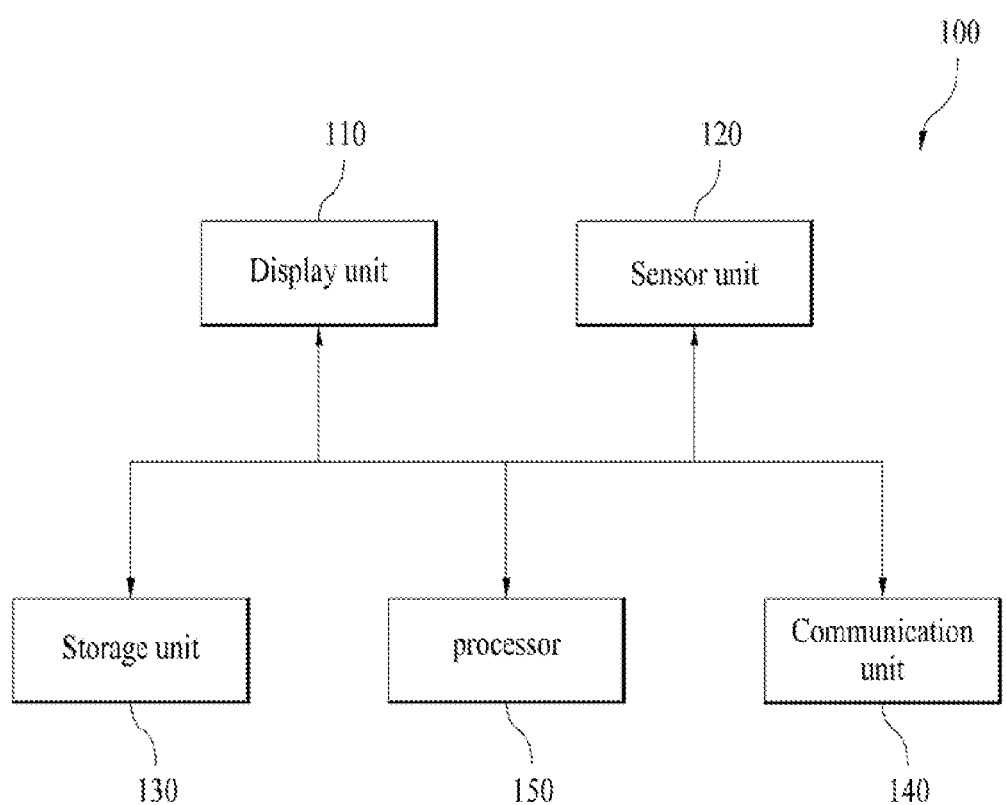
FIG. 1 is a functional block diagram illustrating a display device according to one embodiment of the present specification.

FIG. 1 is a functional block diagram illustrating a display device according to one embodiment. FIG. 1 is only exemplary and some modules may be deleted or new modules may be additionally provided in accordance with the need of the person with ordinary skill in the art.

As shown in FIG. 1, a display device 100 according to one embodiment may include a display unit 110, a sensor unit 120, a storage unit 130, a communication unit 140, and a processor 150.

The display unit 110 outputs image data on a display screen. The display unit 110 may output an image on the basis of contents or applications implemented by the processor 150 or a control command of the processor 150.

Also, the display unit 110 may include a flexible display, and thus may include a curved display area. This will be described in detail with reference to FIG. 2 and FIG. 3.

Next, the sensor unit may include at least one sensing means. According to one embodiment, the at least one sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a global positioning system (GPS) sensor, and a touch sensor.

Also, the sensor unit 120 refers to the aforementioned various sensing means, and may sense various inputs of a user and the environment of the display device 100 and transfer the sensed result to the processor 150, whereby the processor 150 may perform the operation based on the sensed result. The environment of the display device 100 may include location information of the user that uses the display device 100. In other words, the display device 100 may sense the location of the user located near the display device through various sensors such as a proximity sensor and an image sensor.

Also, the aforementioned sensors may be included in the display device 100 as separate elements, or may be incorporated into at least one element.

In the meantime, if the display unit 110 includes a touch sensitive display, it may sense a user input such as a touch input.

Accordingly, the signal based on the sensed result through the sensor unit 120 or the display unit 110 may be transferred to the processor 150. Also, the processor 150 may generate a control signal in accordance with the received signal, and may control units included in the display device 100 by using the control signal.

In other words, a user input may be transferred to the processor through the sensor unit 120 or the display unit 110, as an input signal, and then the processor may generate a control signal by using the input signal.

Hereinafter, if each step or operation performed by the display device starts or is performed through the user input, it is to be understood that the procedure of generating the input signal and the control signal in accordance with the user input is included in the aforementioned description.

Also, it may be expressed that the processor controls the display device or the units included in the display device in accordance with the user input. The processor may be described to mean the display device.

The storage unit 130 may store various digital data such as audio, photos, moving pictures, and applications. The storage unit 130 refers to various digital data storage areas, such as a flash memory, a random access memory (RAM), and a solid state drive (SSD).

Also, the storage unit 130 may temporarily store data received from an external device through the communication unit 140. At this time, the storage unit 130 may be used for buffering for outputting the data, which are received from the external device, from the display device 100. In this case, the storage unit 130 may selectively be provided on the display device 100.

The communication unit 140 may transmit and receive data to and from the external device by performing communication with the external device by using various protocols. Also, the communication unit 140 may transmit and receive digital data such as contents and applications to and from an external network by accessing the external network through wire or wireless. In this case, the communication unit 140 may selectively be provided on the display device 100.

In addition, although not shown in FIG. 1, the display device may include audio input and output units or a power unit.

The audio output unit (not shown) includes an audio output means such as a speaker and earphone. Also, the audio output unit may output voice on the basis of contents implemented in the processor 150 or the control command of the processor 150. At this time, the audio output unit may selectively be provided on the display device 100.

The power unit (not shown) is a power source connected with a battery inside the display device 100 or an external power, and may supply the power to the display device 100.

Also, the display device 100 is shown in FIG. 1 as a block diagram. In FIG. 1, respective blocks are shown to logically identify the elements of the display device. Accordingly, the aforementioned elements of the display device may be provided as one chip or a plurality of chips in accordance with design of the display device.

Figure 2:
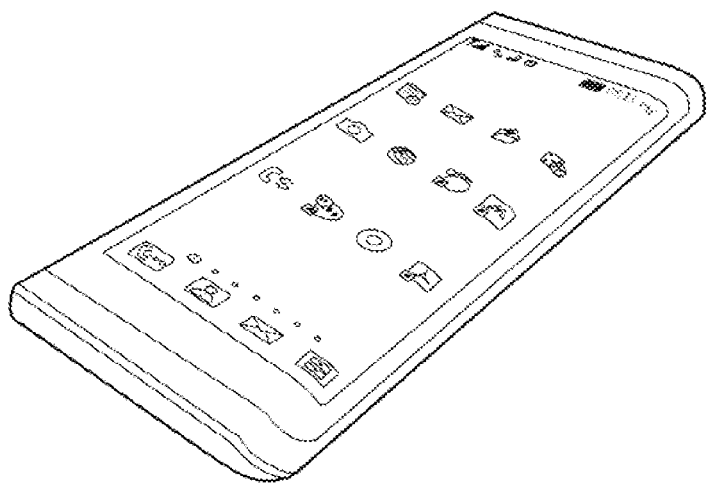
FIG. 2 is a perspective view illustrating a display device according to one embodiment of the present specification.

FIG. 2 is a perspective view illustrating a display device according to one embodiment of the present specification.

The display unit of the display device according to one embodiment may include a curved area. FIG. 2 illustrates that the curved area is included only at one side of the display area. However, unlike FIG. 2, the curved area may be included at one side and the other side of the display area, and the curved area is not limited to a specific type. For convenience of description, the display device that includes a curved area at one side of the display area will be described as a main embodiment.

Figure 3:
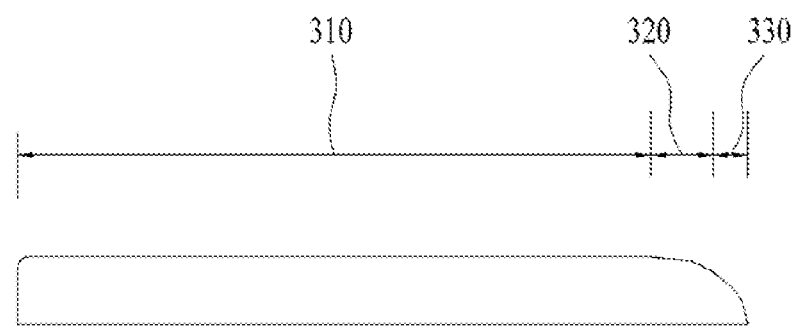
FIG. 3 is a side view illustrating a display device according to one embodiment of the present specification.

FIG. 3 is a side view illustrating a display device according to one embodiment of the present specification. In more detail, FIG. 3 is a side view towards a downward direction of the display device of FIG. 2.

As shown in FIG. 3, the display device may include a flat display area 310 and curved display areas 320 and 330. The flat display area 310 may be located at the front of the display device, and the curved display areas 320 and 330 may be located at the side of the display device.

In this case, if the user is located in front of the display device, the user may view only some area 320 of the flat display area 310 and the curved display areas 320 and 330. Also, if the user is located at the side of the display device, the user may view the curved display areas 320 and 330.

As described above, some area 320 of the curved display areas 320 and 330 is the area that may be viewed by the user regardless of the location of the user located in front of the display device or at the side of the display device. Accordingly, the display device according to one embodiment is intended to provide the user with a wider display area by using the curved display area 320 commonly viewed regardless of the location of the user.

Figure 4:
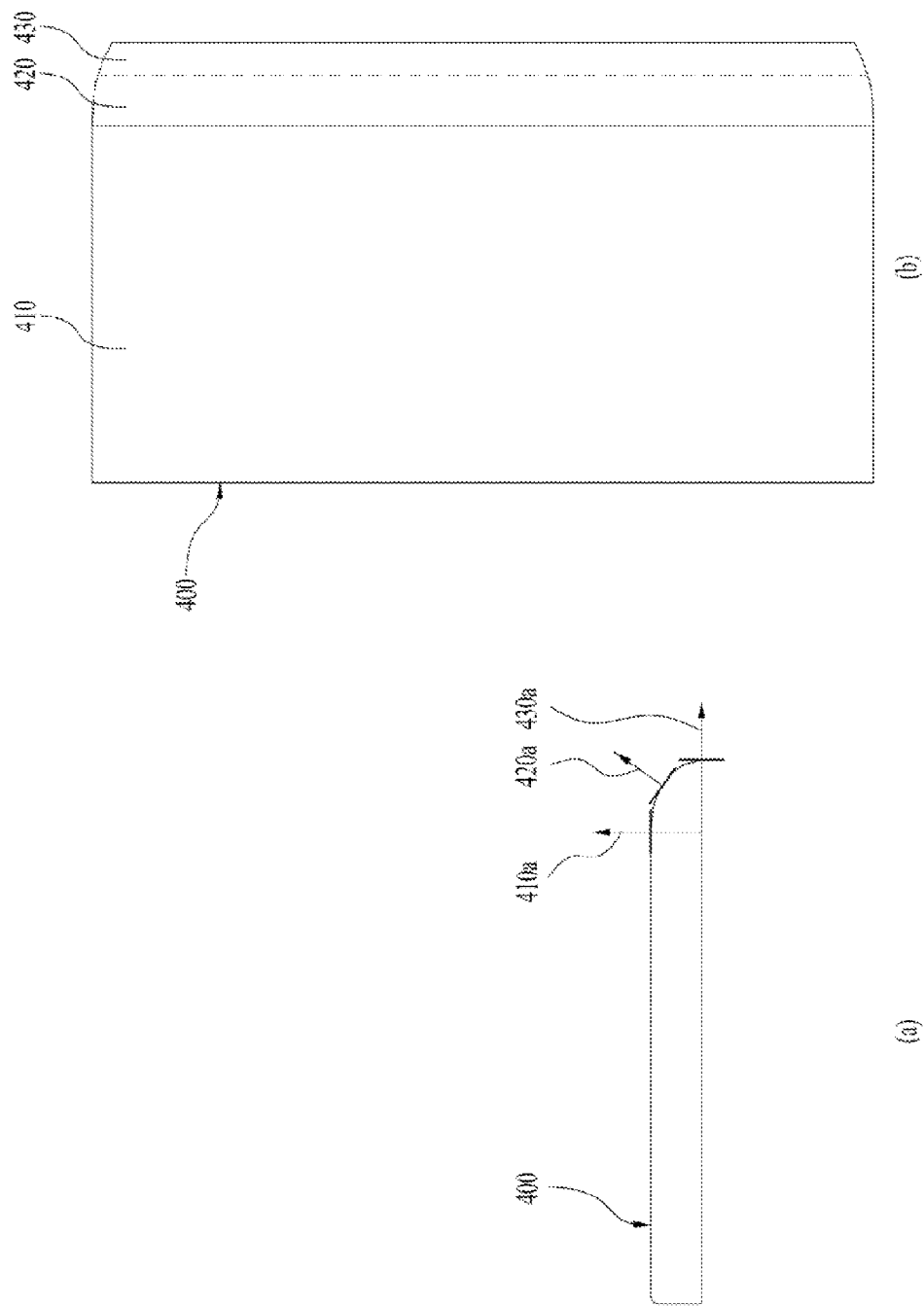
FIGS. 4(a) and 4(b) are side view and front view illustrating a display device according to one embodiment of the present specification.

FIGS. 4(*a*) and 4(*b*) are side view and front view illustrating a display device according to one embodiment of the present specification. FIG. 4(*a*) is a side view of a display device 400, and FIG. 4(*b*) is a front view of the display device 400. In particular, FIG. 4(*a*) is a side view towards a downward direction of the display device 400 of FIG. 4(*b*).

The display device 400 may include a first display area 410 of which normal line is directed towards a first direction 410*a*, a second display area 420 which is adjacent to the first display area 410 and includes a curved area, and a third display area 430 which includes a curved area and of which normal line is directed towards a second direction 420*a*.

The first direction 410*a* may be the direction towards the front side from the rear side of the display device 400. Although the third direction 430*a* is orthogonal towards the rear direction of the display device from the first direction 410*a* in FIG. 4(*a*), it is sufficient that the third direction 430*a* is different from the first direction 410*a* due to a curvature of the display area.

Also, the display device may divide curved areas 420 and 430 into the second display area 420 and the third display area 430 in accordance with a rule which is previously set. For example, the display device may divide the area such that the second display area 420 and the third display area 430 have the same size and the second display area 420 may adjoin the first display area 410 and the third display area 430.

For another example, the display device may divide the area such that the second display area 420 may adjoin the first display area 410 and the third display area 430 in accordance with a range of an average angle of a normal line to a tangent line of the display area. As a result, the normal line direction 420*a* having the average angle of the normal line to the tangent line of the second display area 420 may be different from the first direction 410*a* and the third direction 430*a*.

Also, the average angle of the normal line may be varied depending on the curvature of the display area of the display device. At this time, the display device may use information on the curvature of the curved display area for the view of the user located in front of the display device. Accordingly, the display device may obtain the angle range of the normal line to the tangent line of the display area for the user's view in accordance with the information on the curvature.

Figure 5:
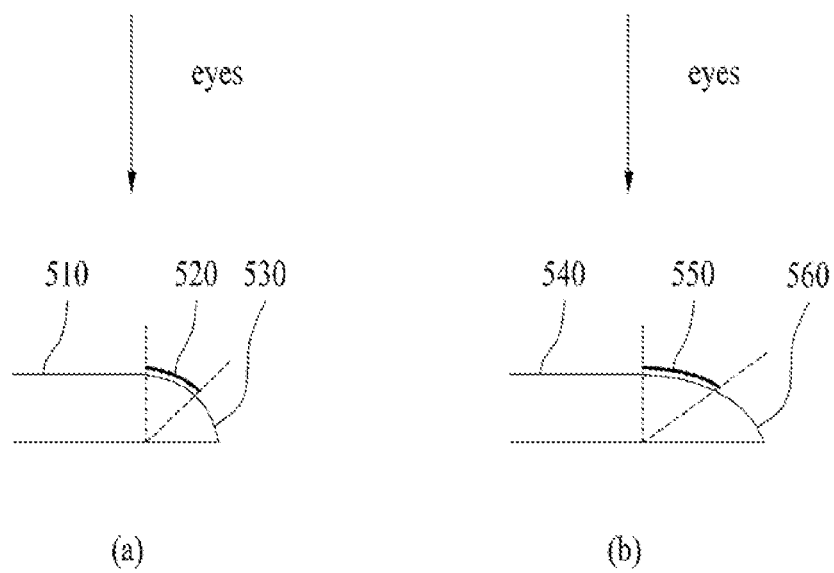
FIG. 5 is a diagram illustrating that a display area is divided differently in accordance with a gradient.

For another example, the display device may divide the display area in accordance a gradient of the display area. FIG. 5 is a diagram illustrating that a display area is divided differently in accordance with a gradient.

FIG. 5(*a*) illustrates that the display device includes a display area 510 having no gradient and display areas 520 and 530 of which gradients are steeply curved. FIG. 5(*b*) illustrates that the display device includes a display area 540 having no gradient and display areas 550 and 560 of which gradients are slowly curved.

As described above, if the display device includes the curved display areas, the user facing the front side of the display device may view the first display area, which is flat, and the second display area of the curved areas. The user cannot view the third display area of the curved area, which is not visible to the user.

As a result, in case of FIG. 5(*a*), the user may view the first display area 510 and the second display area 520 but cannot view the third display area 530. Also, in case of FIG. 5(*b*), the user may view the first display area 540 and the second display area 550 but cannot view the third display area 560.

As described above, if the gradient becomes steep, the size of the curved display area that may be viewed by the user becomes small. Accordingly, it is noted that the size of the second display area 520 shown in FIG. 5(*a*) is smaller than the size of the second display area 550 shown in FIG. 5(*b*).

Also, referring to FIG. 5 in another aspect, FIG. 5(*a*) corresponds to the case where the curvature of the curved display area is uniform and FIG. 5(*b*) corresponds to the case where the curvature of the curved display area is not uniform.

If the curvature is uniform as shown in FIG. 5(*a*), the display device may divide the curved display area into the second display area 520 and the third display area 530 at a certain size. However, if the curvature is not uniform as shown in FIG. 5(*b*), the display device may divide the curved display area into the second display area 550 and the third display area 560 by using information on a curvature range visible to the user who views at the front side.

As a result, the display device may adjust the area where image is displayed, in accordance with the direction of the detected user, whereby the user may view the largest display area at the current location. In other words, the display device may use the second display area 520 as the additional display area of the first display area 510 or the additional display area of the third display area 530 in accordance with the location of the user. Also, the display device may use the second display area 550 as the additional display area of the first display area 540 or the additional display area of the third display area 560 in accordance with the location of the user.

As described above, the display device may control the display mode differently in accordance with the direction of the user. In other words, the display device may adjust the area where contents are displayed, differently in accordance with the display mode. For example, if the direction of the user is the first direction, the display device may enter the first display mode, and if the direction of the user is the second direction, the display device may enter the second display mode.

In this case, the first display mode is the mode that the second display mode 520 or 550 is used as the additional display mode of the first display area 510 or 540. Also, the second display mode is the mode that the second display mode 520 or 550 is used as the additional display mode of the third display area 530 or 560. This will be described in detail with reference to FIG. 6 and FIG. 7.

FIGS. 6a and 6b are side view and front view illustrating a display device which is in a first display mode in accordance with one embodiment. FIG. 6(a) illustrates a side view of the display device, and FIG. 6(b) illustrates a front view of the display device. In this case, the side view shown in FIG. 6(a) is directed towards the downward direction of the display device of FIG. 6(b).

The first display area 610 is the display area of which normal line is directed towards the first direction. The first direction may be the direction towards the front side of the display device from the rear side of the display device. This is because that the user generally views the displayed image data at an opposite side to the front side of the display device.

As shown in FIG. 6(a), the display device 600 may enter the first display mode if it detects the user's eyes in the first direction.

The first display mode is the mode that some area 620 of the curved display area is used as the additional display mode of the first display area 610, wherein the area 620 is visible to the user. Since the description of the display device that divides the curved display area into the area to be used as the additional display area has been made as described above, the detailed description will be omitted.

Accordingly, the display device 600 may display image data in the first display area 610 and the additional display area 620 visible to the user. In other words, the display device 600 may display image data in the display area 630 visible to the user. In this way, the display device 600 may display image data by using the second display area 620 in addition to the first display area 610, whereby the user may view the same image data more greatly.

FIGS. 7(a) and 7(b) are side view and front view illustrating a display device which is in a second display mode in accordance with one embodiment. FIG. 7(a) illustrates a side view of the display device, and FIG. 7(b) illustrates a front view of the display device. In this case, the side view shown in FIG. 7(a) is directed towards the downward direction of the display device of FIG. 7(b).

The third display area 710 is the display area of which normal line is directed towards the second direction. The second direction may be the side direction of the display device. Since the user generally views the displayed image data at an opposite side to the front side of the display device, if the direction from the rear side to the front side is the first direction, the direction shifted to the side at 90 degree with respect to the first direction may be referred to as the second direction.

As shown in FIG. 7(a), the display device 700 may enter the second display mode if it detects the user's eyes in the second direction.

The second display mode is the mode that some area 720 of the curved display area is used as the additional display mode of the third display area 710, wherein the area 720 is visible to the user even in the first direction. Since the description of the display device that divides the curved display area into the area to be used as the additional display area has been made as described above, the detailed description will be omitted.

Accordingly, the display device 700 may display image data in the display area 730 visible to the user. In other words, the display device 700 may display image data in the third display area 710 and the second display area 720. In this way, the display device 700 may display image data by using the second display area 720 in addition to the third display area 610, whereby the user may view the same image data more greatly.

Hereinafter, referring to FIG. 8 and FIG. 9, one embodiment that a main user interface and a peripheral user interface are displayed in the display area will be described in accordance with the display mode of the display device. The main user interface means the user interface, which is conventionally provided, such as a home screen of the display device. The peripheral user interface provides event and notice to the main user interface, and means the interface that is displayed in the curved display area and performs an advertisement function and an alarm function. This will be described in detail with reference to FIG. 12.

Figure 8:
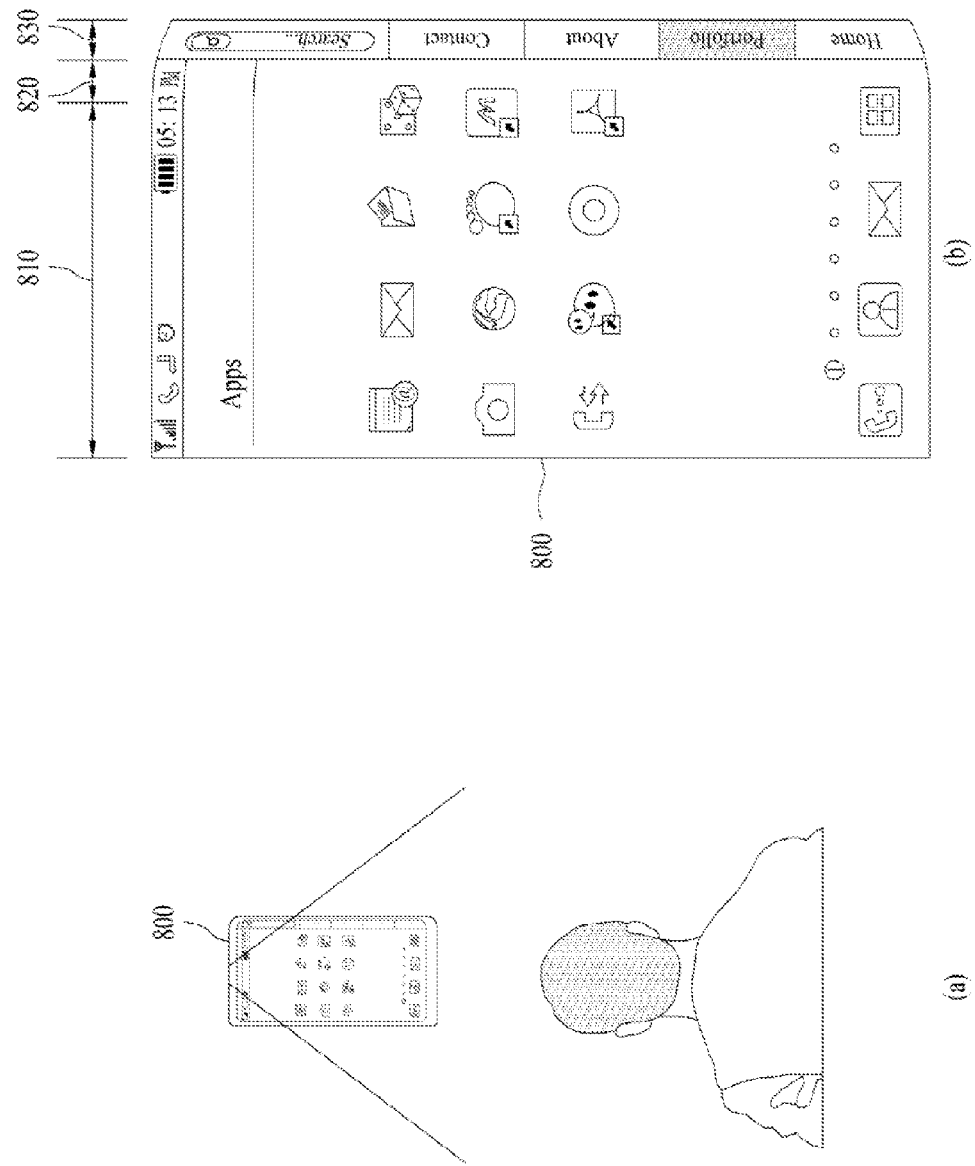
FIG. 8 is a view illustrating a display device which is in a first display mode in accordance with one embodiment.

FIG. 8 is a view illustrating a display device which is in a first display mode in accordance with one embodiment.

As shown in FIG. 8(a), the display device 800 may enter the first display mode if it detects the front of the user in its front direction. In other words, in FIG. 8, the direction of the user for allowing the display device to enter the first display mode corresponds to the front direction of the display device.

At this time, the first direction may include the direction from the front side of the display device to the rear side of the display device and the direction from the rear side of the display device to the front side of the display device. Accordingly, the first direction may be the same direction as that of the normal line of the first display area 810 which is flat.

The display device 800, which has detected that the direction of the user is the first direction, may display the main user interface in the first display area 810 and the second display area 820 and display the peripheral user interface in the third display area 830 as shown in FIG. 8(b). In other words, the display device 800 may use the second display area 820 as the additional display area of the first display area 810.

Accordingly, the display device 800 may display the main user interface to correspond to the user's eyes located in front of the display device 800. As a result, it is advantageous in that the user may use the greater screen.

Figure 9:
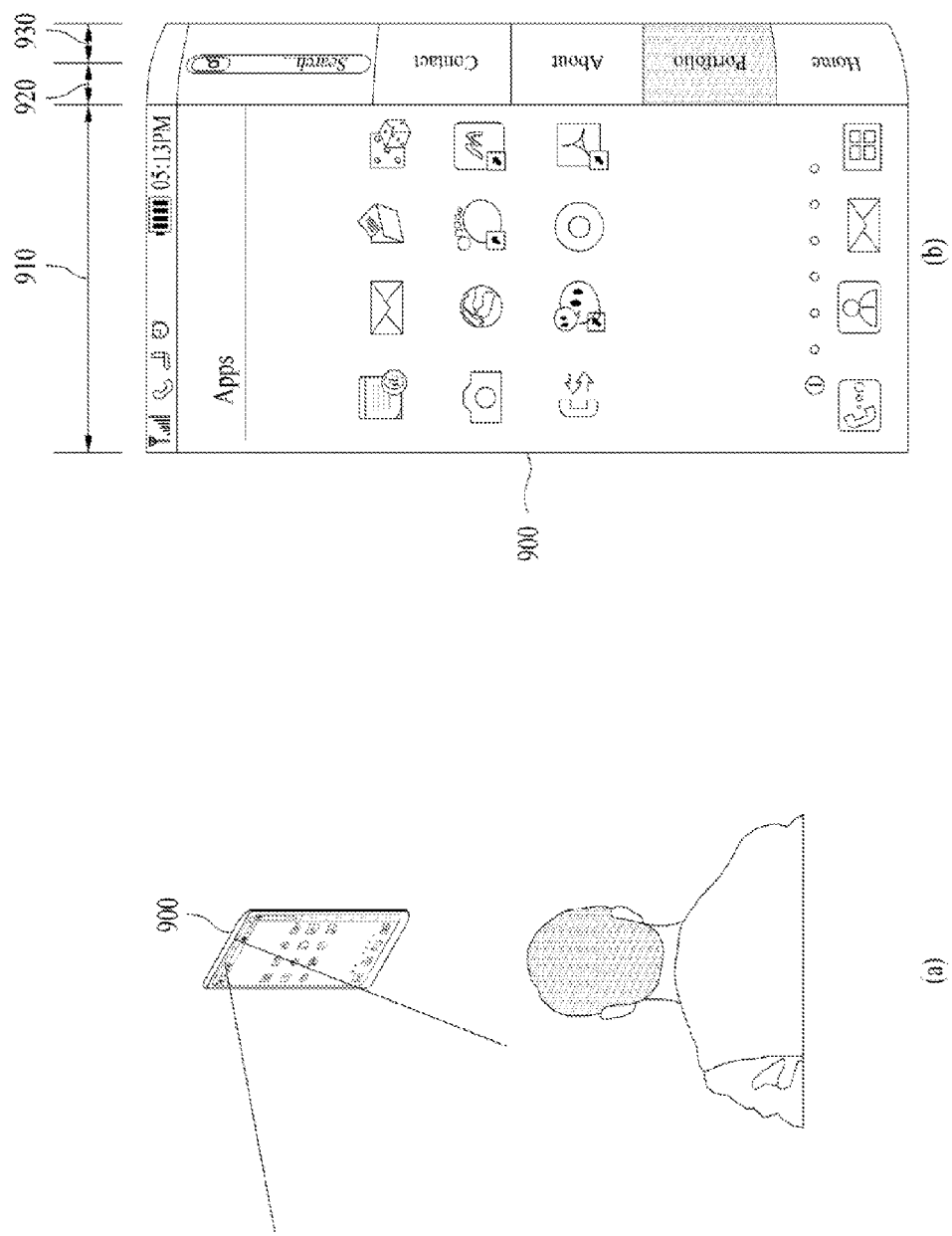
FIG. 9 is a view illustrating a display device which is in a second display mode in accordance with one embodiment.

FIG. 9 is a view illustrating a display device which is in a second display mode in accordance with one embodiment.

As shown in FIG. 9(a), the display device 900 may enter the second display mode if it detects the front of the user in its side direction. In other words, in FIG. 9, the direction of the user for allowing the display device to enter the second display mode corresponds to the side direction of the display device.

At this time, the second direction may include the direction from one side of the display device to the other side of the display device and the direction from the other side of the display device to one side of the display device. Accordingly, the second direction may be different from the first direction, and may be the direction rotated at about 90 degree towards the side direction from the first direction.

The display device 900, which has detected that the direction of the user is the second direction, may display the main user interface in the first display area 910 and display the peripheral user interface in the second display area 920 and the third display area 930 as shown in FIG. 9(b). In other words, the display device 900 may use the second display area 920 as the additional display area of the third display area 930.

Accordingly, the display device 900 may display the peripheral user interface to correspond to the user's eyes located at the side of the display device 900. As a result, it is advantageous in that the user may view the peripheral user interface, which is displayed at the side of the display device, at an enlarged size.

In the meantime, as shown in FIG. 6 to FIG. 9, the display device may detect the direction of the user to enter the first display mode or the second display mode. The direction of the user means the direction viewed by the user. However, the direction of the user does not mean only the direction from the front side of the user to the display device. The direction of the user may mean the direction from the display device to the front side of the user. Also, the display device may identify the direction of the user by detecting the front side of the user, etc.

For example, the display device may acquire an image adjacent to the display device by using an image sensor. The display device may identify the direction of the user by detecting the user from the acquired image or detecting the user's face or the user's eyes. In this way, if the display identifies the direction of the user by detecting the user's face or eyes, advantages similar to those obtained by the user's eyes direction may be obtained.

For another example, the display device may identify the location of the user adjacent to the display device by using a proximity sensor, etc. The display device may determine the direction of the user in accordance with the location of the user. In this case, the direction of the user, which is determined by the display device, may be the same as the direction viewed by the user or not. However, if it is also detected whether the user grips the display device, exactness may be increased.

As described above, the display device may detect the location of the user in various manners. Also, the method for detecting the location of the user in the display device is not limited to a specific method.

Also, the display device may detect change of the location of the user in addition to the location of the user. The display device may identify the change of the location of the user by detecting the location of the user at a time interval which is previously set. Otherwise, the display device may detect the change of the location of the user through a sensor that senses motion.

At this time, the display device may change the display mode by corresponding to the change of the location of the user. This will be described with reference to FIG. 10.

Figure 10:
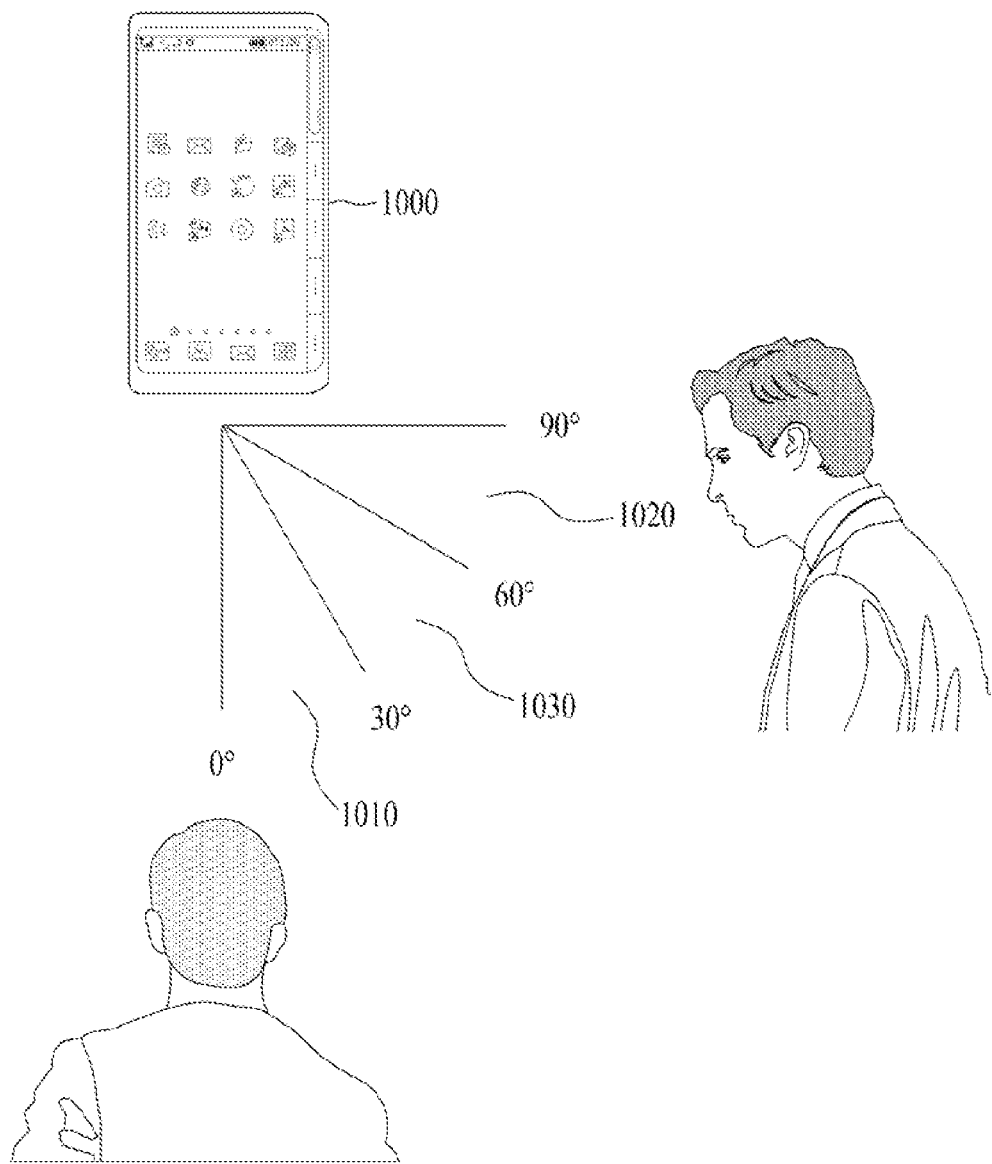
FIG. 10 is a view illustrating a location relation between a display device and a user in accordance with one embodiment.

FIG. 10 is a view illustrating a location relation between a display device and a user in accordance with one embodiment. In the embodiment of FIG. 10, the first direction corresponds to the normal line direction of the front side of the display device, and the second direction corresponds to the normal line direction of the side of the display device. However, the first direction and the second direction are not limited to the embodiment of FIG. 10, and may be varied depending on the curvature or gradient of the display area.

The display device 1000 may enter the first display mode if the direction of the user is the first direction and enter the second display mode if the direction of the user is the second direction, as described above. Also, the display device 1000 may detect the direction of the user and change the display mode in accordance with the changed direction of the user.

The display device 1000 enters the first display mode if the direction of the user is within the range 1010 (hereinafter, referred to as 'first range') between 0 degree and 30 degree from the first direction towards the second direction. Accordingly, if the display device 1000 is already in the first display mode and the direction of the user is changed within the first range 1010, the display device does not change the display mode.

Also, the display device 1000 enters the second display mode if the direction of the user is within the range 1020 (hereinafter, referred to as 'second range') between 60 degree and 90 degree from the first direction towards the second direction. Accordingly, if the display device 1000 is already in the second display mode and the direction of the user is changed within the second range 1020, the display device does not change the display mode.

Also, the display device 1000 may enter a switch over mode if the direction of the user is within the range 1030 (hereinafter, referred to as 'third range') between 30 degree and 60 degree from the first direction towards the second direction. The switch over mode is the mode switched between the first display mode and the second display mode. Accordingly, the switch over mode may be the first display mode or the second display mode.

Accordingly, if the display device 1000 detects that the direction of the user belongs to the third range 1030 switched from the first range 1010, it may switch the first display mode to the second display mode when the direction of the user is greater than a first angle from the first direction towards the second direction. Also, if the display device 1000 detects that the direction of the user belongs to the third range 1030 switched from the second range 1020, it may switch the second display mode to the first display mode when the direction of the user is smaller than a second angle from the first direction towards the second direction.

At this time, the first angle and the second angle belong to the third range 1030, and the first angle may be greater than the second angle. In other words, the first angle and the second angle belong to the range between 30 degree and 60 degree from the first direction towards the second direction, and may previously set by the display device 1000 to have the greater values.

One embodiment that the first angle is previously set to 50 degree and the second angle is previously set to 40 degree from the first direction towards the second direction will be described.

The display device 1000 which is in the first display mode enters the switch over mode if the detected direction of the user is within the third range 1030. At this time, the display device may continue to maintain the first display mode if the direction of the user is within the range between 30 degree and 50 degree from the first direction towards the second direction, and then may switch the first display mode to the second display mode if the direction of the user is greater than 50 degree. For example, the display device 1000 of the first display mode may switch the first display mode to the second display mode if the direction of the user corresponds to 50 degree from the first direction towards the second direction.

As compared with the first display mode, the display device 1000 which is in the second display mode enters the switch over mode if the detected direction of the user is within the third range 1030. At this time, the display device may continue to maintain the second display mode if the direction of the user is within the range between 40 degree and 60 degree from the first direction towards the second direction, and then may switch the second display mode to the first display mode if the direction of the user is smaller than 40 degree. For example, the display device 1000 of the second display mode may switch the second display mode to the first display mode if the direction of the user corresponds to 40 degree from the first direction towards the second direction.

As described above, each of the first angle and the second angle may have various values within the range between 30 degree and 60 degree from the first direction towards the second direction. However, the first angle should be greater than the second angle.

Also, the range, to which the angle on the boundary of the first range 1010, the third range 1030 and the second range 1020 belongs, may be varied depending on the rule which is set. For example, if the direction of the user, which is detected by the display device 1000, corresponds to 30 degree from the first direction towards the second direction, the display device 1000 may determine that the range of angle belongs to the first range 1010 or the third range 1030. In other words, the range of the angle may be varied depending on the rule which is previously set.

As described above, supposing that the location of the user is varied, the display area visible to the user's eyes may be varied depending on the location of the user. Accordingly, the display device according to one embodiment may adjust the second display area and the third display area in accordance with the direction of the user.

For example, if the display device detects the user located within the third range 1030, the second display area may be enlarged or reduced in accordance with the location of the user before the angle reaches the first angle or the second angle.

Figure 11:
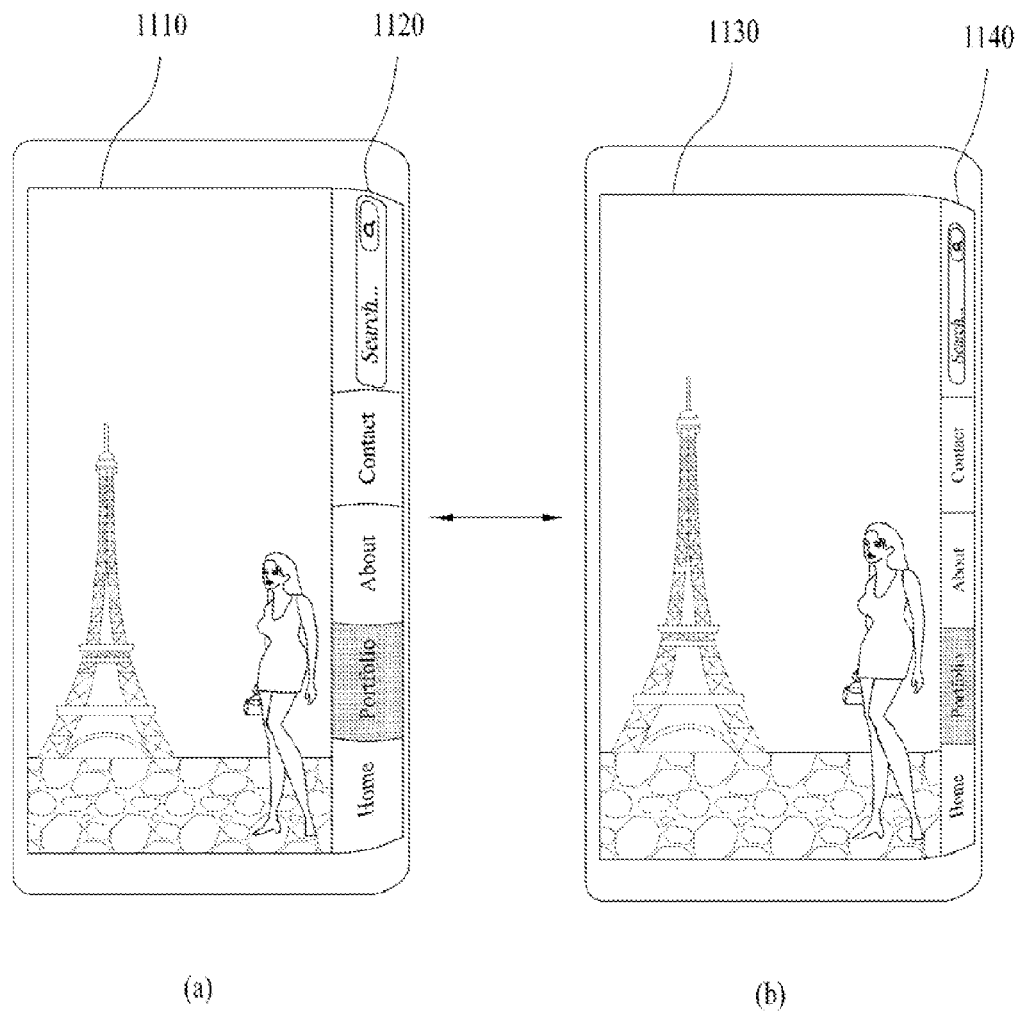
FIG. 11 is a view illustrating that a mode of a display device is switched between a first display mode and a second display mode in accordance with one embodiment.

FIG. 11 is a view illustrating that a mode of a display device is switched between a first display mode and a second display mode in accordance with one embodiment.

The display device may be in the first display mode as shown in FIG. 11(a) or the second display mode as shown in FIG. 11(b) in accordance with the detected direction of the user. Also, the display device may switch the first display mode and the second display mode between each other by detecting the change of the direction of the user.

As shown in FIG. 11(a), the display device of the first display mode may provide the main user interface 1110 to the first display area and the second display area, and may provide the peripheral user interface 1120 to the third display area.

Also, as shown in FIG. 11(b), the display device of the second display mode may provide the main user interface 1130 to the first display area, and may provide the peripheral user interface 1140 to the second display area and the third display area.

Accordingly, as shown in FIG. 11, if the first display mode of the display device is switched to the second display mode, the display device may reduce the main user interface 1110 to the first display area, and may enlarge the peripheral user interface 1120 to the second display area. At this time, it is advantageous in that a area, which cannot be viewed by the user, does not occur even though the size of the main user interface is reduced.

Also, unlike FIG. 11, if the first display mode of the display device is switched to the second display mode, the main user interface 1110 may be shifted to the first display area, and the peripheral user interface 1120 may shifted to the second display area. In this case, it is advantageous in that the size of the main user interface is maintained as it is even though a area, which cannot be viewed by the user, occurs. In particular, since a corner of the main user interface remains as an empty space or useless information is displayed in the corner of the main user interface, if the main user interface is shifted for display, inconvenience of the user may little occur even though some area of the main user interface is not displayed.

Also, as shown in FIG. 11, if the second display mode of the display device is switched to the first display mode, the display device may enlarge the main user interface 1130 to the second display area, and may reduce the peripheral user interface 1140 to the third display area.

Also, unlike FIG. 11, if the second display mode of the display device is switched to the first display mode, the main user interface 1130 may be shifted to the second display area, and the peripheral user interface 1140 may shifted to the third display area.

Figure 12:
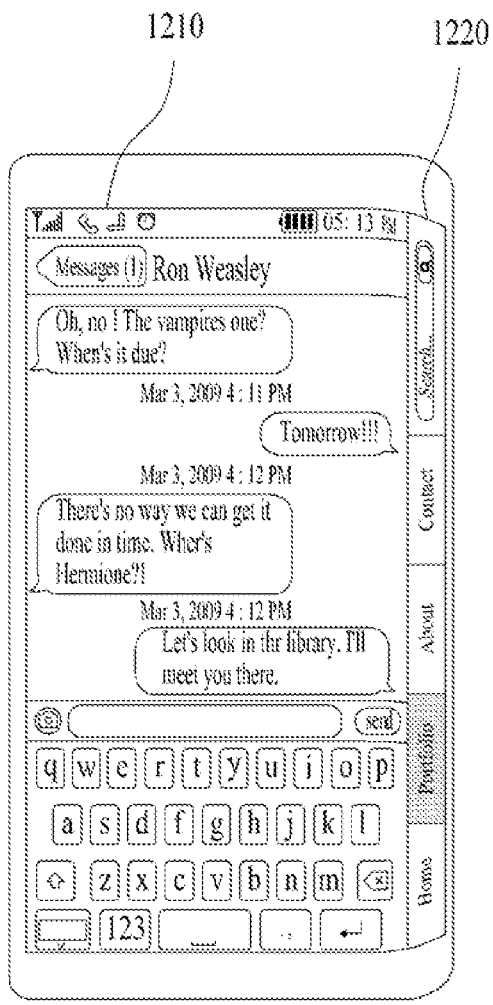
FIG. 12 is a view illustrating a main user interface and a peripheral user interface displayed in a display device in accordance with one embodiment.

FIG. 12 is a view illustrating a main user interface and a peripheral user interface displayed in a display device in accordance with one embodiment.

The main user interface 1210 may display a home screen of the display device or contents currently in service. Accordingly, the display device may display a screen for implementing an application installed in the home screen or a screen for implementing contents, through the main user interface 1210. The main user interface 1210 may use a display area greater than that of the peripheral user interface 1220.

The peripheral user interface 1220 may provide an event or notice for the main user interface. Accordingly, if the display device detects an event (for example, task completion, text message transmission and reception completion, mail transmission and reception completion, etc.), it may notify the user of the detected event through the peripheral user interface 1220.

Also, the peripheral user interface 1220 may use a display area smaller than that of the main user interface 1210. Since it is likely that importance of contents displayed in the peripheral user interface 1220 is less than that of contents displayed in the main user interface 1210, the peripheral user interface 1220 may be displayed in the curved display area. Accordingly, the display device may provide at least one icon corresponding to applications, quick menus and advertisements through the peripheral user interface.

Accordingly, as shown in FIG. 12, if the user uses a texting service, the display device may provide an interface for a texting service through the main user interface 1210, and may provide icons, which provide a short cut function for a contact list application, a shifting menu to a home screen and a search menu, to the peripheral user interface 1220.

Also, the display device may provide an object, that changed its display attributes from the main user interface, through the peripheral user interface.

For example, as shown in FIG. 12, if the display device provides the interface for a texting service through the main user interface 1210, it may provide an icon or a separate message notifying text reception to the peripheral user interface when receiving the text.

For another example, if the display device provides the interface for a texting service through the main user interface 1210, it may display an icon related to the texting service to allow the peripheral user interface to know that the texting service is currently in service.

In other words, the objects displayed by the main user interface mean various types of tasks, which may be implemented by the display device, such as applications, contents, widget, and files. Accordingly, the object that has changed display attributes may be an icon corresponding to task.

In the meantime, one embodiment that the display device identifies the second display area from the third display area in accordance with the curvature and gradient of the display area has been described as above. However, the display device according to another embodiment may provide a setup interface that allows the user to set the second display area and the third display area.

Figure 13:
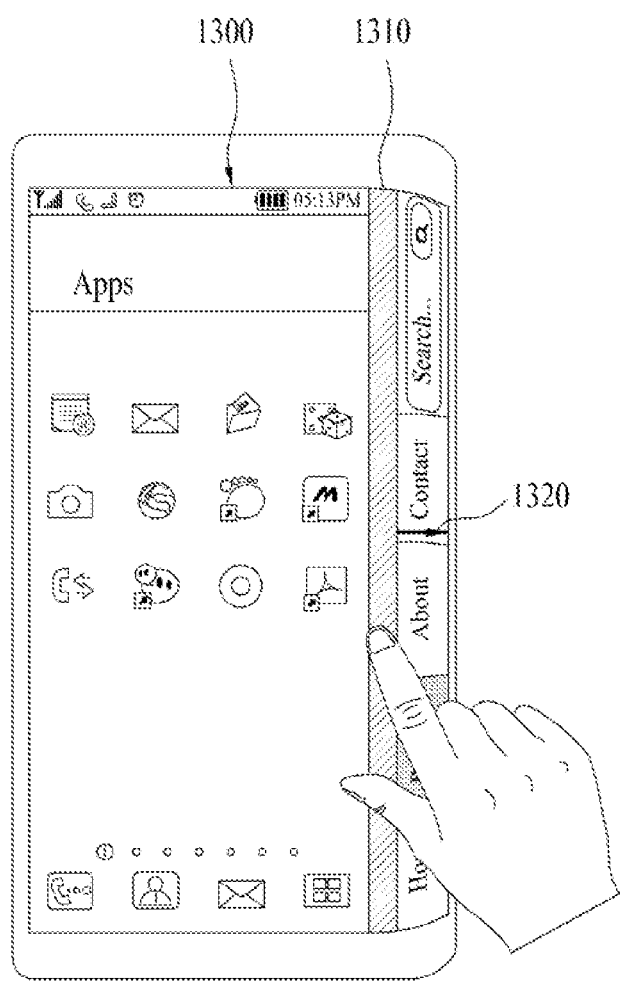
FIG. 13 is a view illustrating a setup interface provided by a display device in accordance with one embodiment.

FIG. 13 is a view illustrating a setup interface provided by a display device in accordance with one embodiment.

The display device may adjust the size of the second display area through a user input for the setup interface 1300. Also, the display device may adjust a boundary line, which identifies the second display area 1310 from the third display area, through the user input for the setup interface 1300, and may provide an indicator 1320 for adjusting the boundary line.

Accordingly, if the display device detects a zoom-in or zoom-out input for the second display area 1310, it may adjust the size of the second display area 1310. Also, if the display device detects a drag input for the boundary line that identifies the second display area 1310 from the third display area, it may adjust the sizes of the second display area 1310 and the third display area.

Accordingly, the user may set the display area convenient to view image, in accordance with an angle with the display device, whereby the display device may improve user convenience.

Figure 14:
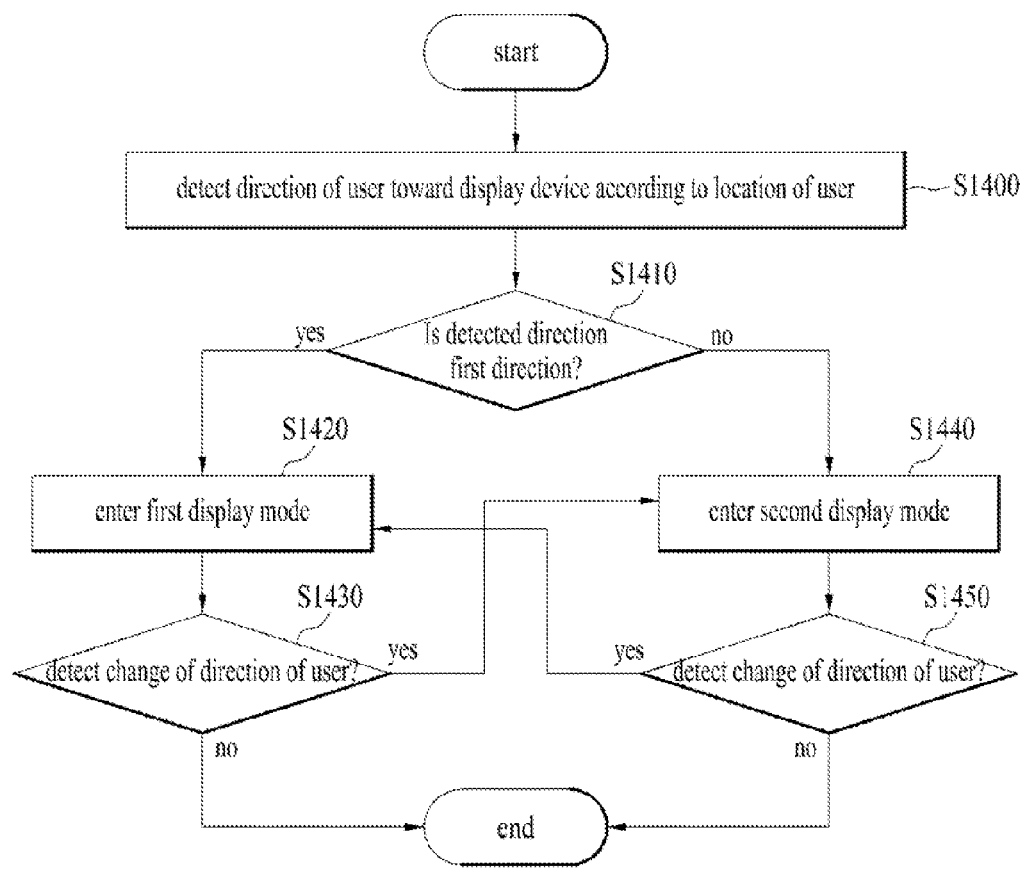
FIG. 14 is a flow chart illustrating a method for controlling a display device in accordance with one embodiment.

FIG. 14 is a flow chart illustrating a method for controlling a display device in accordance with one embodiment.

First of all, as described with reference to FIG. 4 and FIG. 5, the display device may detect the direction of the user thereto in accordance with the location of the user (S1400). The direction of the user means the direction viewed by the user. Accordingly, the display device may detect the direction of the user by detecting the user's face, the user's eye, etc. through the image sensor. At this time, the direction of the user may be the direction from the display device to the user, or vice versa.

Figure 6:
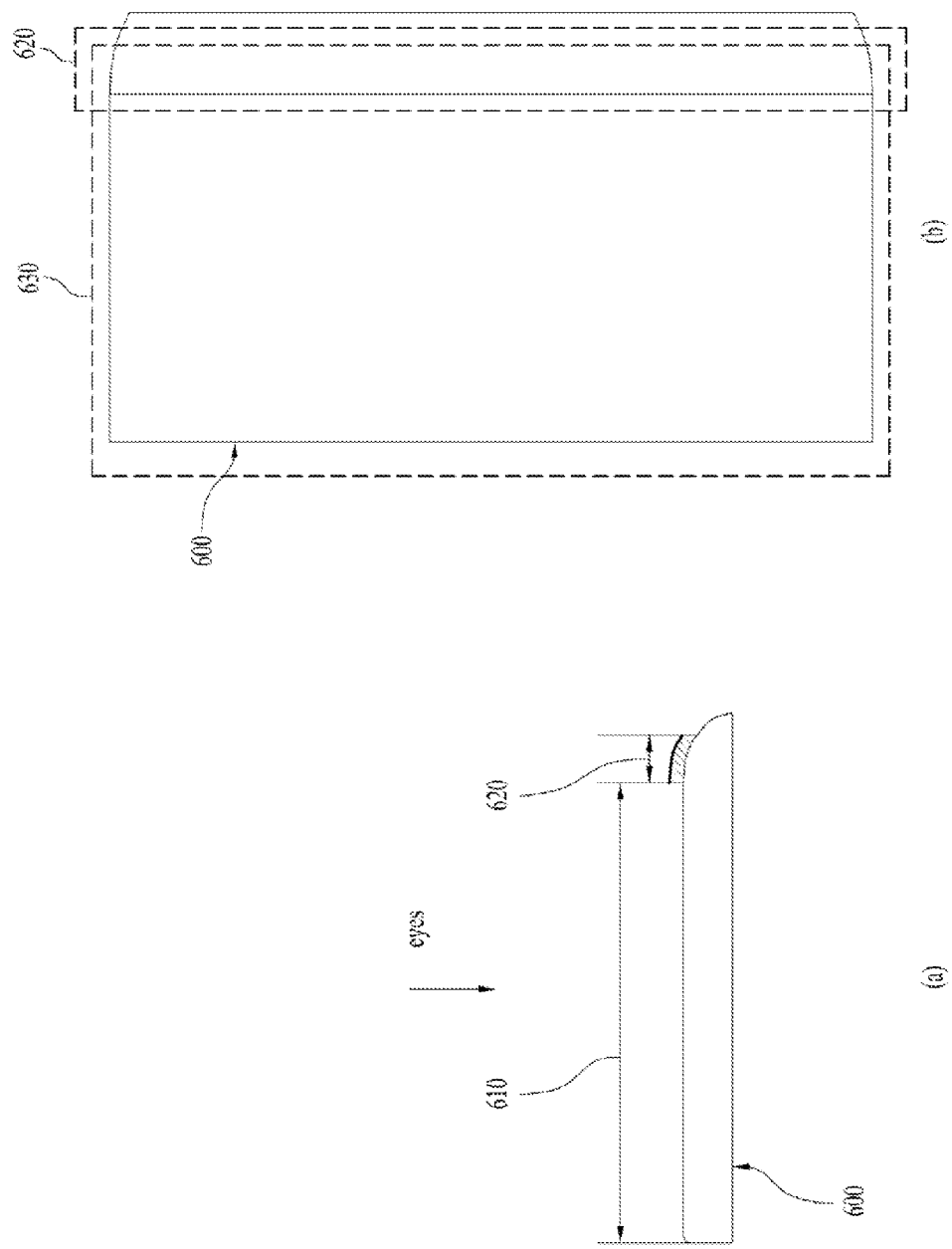
FIGS. 6(a) and 6(b) are side view and front view illustrating a display device which is in a first display mode in accordance with one embodiment.
Figure 7:
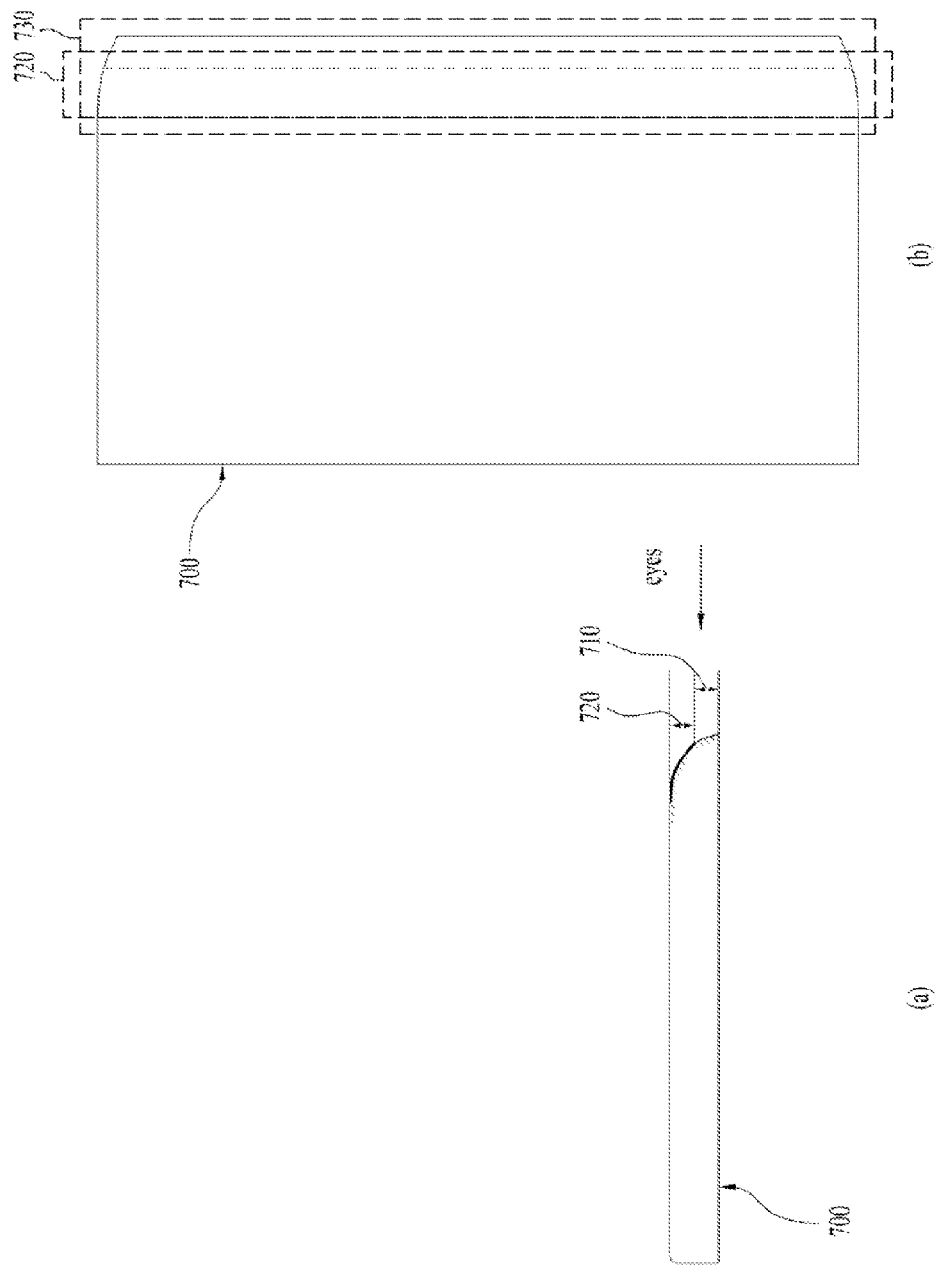
FIGS. 7(a) and 7(b) are side view and front view illustrating a display device which is in a second display mode in accordance with one embodiment.

As described with reference to FIG. 6 and FIG. 7, the display device determines the detected direction (S1410). The display device may enter the first display mode if the detected direction corresponds to the first direction (S1420). Since the first direction is the same as the aforementioned direction, its detailed description will be omitted.

In other words, as described with reference to FIG. 4, the display unit of the display device may include a first display area of which normal line is directed towards the first direction, a second display area, which is adjacent to the first display area and includes a curved area, and a third display area which is adjacent to the second display area and includes a curved area and of which normal line is directed towards the second direction.

The first display area may be flat, and the second direction is different from the first direction. Accordingly, the display device may identify the second display area from the third display area in accordance with the rule which is previously set and includes at least one of the curvature and gradient of the curved area and an angle range of the normal line.

Accordingly, as described with reference to FIG. 6 and FIG. 8, the display device, which has entered the first display mod, may use the second display area as additional display area of the first display area.

In the meantime, as described with reference to FIG. 7 and FIG. 9, the display device determines the detected direction (S1410), which may not correspond to the first direction. In other words, if the detected direction corresponds to the second direction, the display device may enter the second display mode (S1440). The second display mode means that the second display area is used as additional display area of the third display area.

At this time, as described with reference to FIG. 10, the display device of the second display mode may detect the change of the direction of the user (S1450). If the display device detects the change of the direction of the user, it may enter the first display mode (S1420). Also, the display device of the first display mode may detect the change of the direction of the user (S1430). If the display device detects the change of the direction of the user, it may detect the second display mode (S1440).

In other words, the display device may divide the direction of the user from the first direction to the second direction into a first range between 0 degree and 30 degree, a second range between 60 degree and 90 degree, and a third range between 30 degree and 60 degree. At this time, the display device of the first display mode maintains the first display mode even though it detects the change of the direction of the user within the first range. On the other hand, if the display device detects the change of the direction of the user from the first range to the third range, it may enter the switch over mode. The switch over mode means the mode switched between the first display mode and the second display mode. If the rule which is previously set is satisfied, the mode switching may be performed. Accordingly, the display device of the switch over mode may switch the first display mode to the second display mode if the direction of the user becomes greater than the first angle from the first direction towards the second direction.

Also, the display device of the second display mode maintains the second display mode even though it detects the change of the direction of the user within the second range. On the other hand, if the display device detects the change of the direction of the user from the second range to the third range, it may enter the switch over mode. Accordingly, the display device of the switch over mode may switch the second display mode to the first display mode if the direction of the user becomes smaller than the second angle from the first direction towards the second direction.

At this time, the first angle and the second angle belong to the range between 30 degree and 60 degree from the first direction towards the second direction, and the first angle is greater than the second angle.

As is apparent from the above description, the curved display area may efficiently be used.

Also, according to another embodiment of the present specification, the curved display area may be used as additional display area for displaying image data fully or partially displayed. Accordingly, the display area viewed by the user may be used within the maximum range in accordance with the location of the user.

According to other embodiment of the present specification, contents displayed in the curved display area may be adjusted in accordance with the location of the user. In other words, the other display area that uses the curved display area as additional display area may be set differently. Accordingly, the display device may use the curved display area in various manners in accordance with the location of the user.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

The display device and the method for controlling the same according to the embodiment are not limited to the aforementioned embodiments, and all or some of the aforementioned embodiments may selectively be configured in combination so that various modifications may be made in the aforementioned embodiments.

In the meantime, the method for controlling the display device may be implemented in a recording medium, which can be read by a processor provided in the network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementarily if necessary.

What is claimed is:

1. A display device comprising:
a sensor unit configured to sense a location of a user and transferring a signal based on the sensed result to a processor;
a display unit configured to output image data, wherein the display unit includes a first display area of which normal line is directed towards a first direction, a second display area which is adjacent to the first display area and includes a curved area, and a third display area which is adjacent to the second display area and includes a curved area and of which normal line is directed towards a second direction; and
the processor configured to control the sensor unit and the display unit,
wherein the processor is further configured to:
detect a direction of the user towards the display device according to the location of the user,
enter a first display mode if the direction of the user corresponds to the first direction, wherein the first display mode uses the second display area as an additional display area of the first display area, and
enter a second display mode if the direction of the user corresponds to the second direction, wherein the second display mode uses the second display area as an additional display area of the third display area.

2. The display device according to claim 1, wherein the processor enters the first display mode if the direction of the user is within the range between 0 degree and 30 degree from the first direction towards the second direction.

3. The display device according to claim 1, wherein the processor enters the second display mode if the direction of the user is within the range between 60 degree and 90 degree from the first direction towards the second direction.

4. The display device according to claim 1, wherein the processor enters a switch over mode, if the direction of the user is within the range between 30 degree and 60 degree from the first direction towards the second direction,
wherein the switch over mode switches between the first display mode and the second display mode and the display device in the switch over mode may be the first display mode or the second display mode.

5. The display device according to claim 4, wherein, if the display device in the switch over mode, the processor switches the first display mode to the second display mode when the direction of the user is greater than a first angle from the first direction towards the second direction, and switches the second display mode to the first display mode when the direction of the user is smaller than a second angle from the first direction towards the second direction.

6. The display device according to claim 5, wherein the first angle and the second angle belong to the range between 30 degree and 60 degree from the first direction towards the second direction, and the first angle is greater than the second angle.

7. The display device according to claim 1, wherein the processor adjusts the second display area and the third display area according to the direction of the user.

8. The display device according to claim 1, wherein, if the display device is in the first display mode, the processor provides a main user interface in the first display area and the second display area, and provides a peripheral user interface in the third display area.

9. The display device according to claim 8, wherein, if the first display mode of the display device is switched to the second display mode, the processor reduces the main user interface to adjust a size of the main user interface to the first display area and enlarges the peripheral user interface to adjust a size of the peripheral user interface to the second display area.

10. The display device according to claim 8, wherein, if the first display mode of the display device is switched to the second display mode, the processor shifts the main user interface to the first display area and shifts the peripheral user interface to the second display area.

11. The display device according to claim 8, wherein the peripheral user interface provides an event and notice for the main user interface.

12. The display device according to claim 8, wherein the peripheral user interface provides at least one icon corresponding to advertisement, quick menu, and application.

13. The display device according to claim 8, wherein the peripheral user interface provides an object that changed its display attributes from the main user interface.

14. The display device according to claim 1, wherein, if the display device is in the second display mode, the processor provides a main user interface in the first display area, and provides a peripheral user interface in the second display area and in the third display area.

15. The display device according to claim 14, wherein, if the second display mode of the display device is switched to the first display mode, the processor enlarges the main user interface to adjust a size of the main user interface to the second display area and reduces the peripheral user interface to adjust a size of the peripheral user interface to the third display area.

16. The display device according to claim 14, wherein, if the second display mode of the display device is switched to the first display mode, the processor shifts the main user interface to the second display area and shifts the peripheral user interface to the third display area.

17. The display device according to claim 1, wherein the processor provides a setup interface that sets the second display area and the third display area.

18. The display device according to claim 17, wherein the processor adjusts the second display area and the third display area according to a signal of the setup interface.

19. The display device according to claim 1, wherein the display device includes a flexible display.

20. A method for controlling a display device, which includes a display unit including a first display area of which normal line is directed towards a first direction, a second display area which is adjacent to the first display area and includes a curved area, and a third display area which is adjacent to the second display area and includes a curved area and of which normal line is directed towards a second direction, the method comprising the steps of:
- detecting a direction of a user towards the display device according to a location of the user, which is sensed through a sensor unit;
- entering a first display mode if the detected direction of the user corresponds to the first direction, wherein the first display mode uses the second display area as an additional display area of the first display area; and
- entering a second display mode if the detected direction of the user corresponds to the second direction, wherein the second display mode uses the second display area as an additional display area of the third display area.

* * * * *